United States Patent
Pesce

(10) Patent No.: US 10,230,228 B1
(45) Date of Patent: Mar. 12, 2019

(54) DEVICE FOR ASSISTING IN CUTTING WALLBOARD OPENINGS OVER ELECTRICAL BOXES

(71) Applicant: John Pesce, Melrose, MA (US)

(72) Inventor: John Pesce, Melrose, MA (US)

( * ) Notice: Subject to any disclaimer, the term of this patent is extended or adjusted under 35 U.S.C. 154(b) by 0 days.

(21) Appl. No.: 15/986,102

(22) Filed: May 22, 2018

Related U.S. Application Data

(60) Provisional application No. 62/524,724, filed on Jun. 10, 2017.

(51) Int. Cl.
- H02G 3/12 (2006.01)
- H02G 3/08 (2006.01)
- H02G 3/14 (2006.01)

(52) U.S. Cl.
CPC ............ *H02G 3/12* (2013.01); *H02G 3/081* (2013.01); *H02G 3/14* (2013.01)

(58) Field of Classification Search
None
See application file for complete search history.

(56) References Cited

U.S. PATENT DOCUMENTS

| | | | |
|---|---|---|---|
| 2,898,688 A * | 8/1959 | Cottar | B25H 7/04 220/3.4 |
| 3,057,285 A * | 10/1962 | Wheeler | E04B 1/7076 29/432 |
| 3,884,280 A * | 5/1975 | Chailer | B23B 45/003 144/144.1 |
| 4,059,905 A * | 11/1977 | Wieting | G01B 5/00 33/528 |
| 4,087,913 A * | 5/1978 | Jackson | B26F 1/386 30/360 |
| 5,040,304 A * | 8/1991 | Jackson | H02G 3/12 33/528 |
| 5,853,269 A * | 12/1998 | Young | B23B 41/04 408/1 R |
| 6,463,668 B1 * | 10/2002 | Williams | B25H 7/04 33/528 |
| 7,432,444 B1 | 10/2008 | McCusker | |
| 7,442,874 B2 | 10/2008 | Compagnone, Jr. | |
| 9,358,623 B2 * | 6/2016 | Burks | B23D 49/11 |

\* cited by examiner

*Primary Examiner* — Dimary S Lopez Cruz

(74) *Attorney, Agent, or Firm* — Thomas P. O'Connell; O'Connell Law Firm

(57) ABSTRACT

A cutting device for assisting in the cutting of wallboard openings for electrical boxes. A plurality of spikes project from a base frame in a spike pattern that defines a periphery of an opening to be cut. When driven into the wallboard, the spikes perforate the wallboard in the spike pattern. The spikes can be fixed or slidable relative to the base frame. The spike pattern can be rectangular with adjacent spikes closely spaced. The spikes can have an effective maximum lateral dimension, such as an effective diameter of a spike shank, and the distance between adjacent spikes can be less than the effective maximum lateral dimension of the spikes. A cover can be retained relative to an electrical box with a guide, such as a pin. The base frame can have a corresponding guide, such as an aperture, for selectively engaging the guide retained by the cover.

17 Claims, 16 Drawing Sheets

DEVICE FOR ASSISTING IN CUTTING WALLBOARD OPENINGS OVER ELECTRICAL BOXES

RELATED APPLICATION

This application claims the benefit of U.S. Provisional Patent Application No. 62/524,724, filed Jun. 10, 2017, which is incorporated herein by reference.

FIELD OF THE INVENTION

This invention relates generally to the location and cutting of openings for electrical boxes behind sheets of wallboard. More particularly, disclosed and protected herein is a device for assisting in the location of electrical boxes behind sheets of wallboard and for enabling the accurate and efficient cutting of openings for electrical boxes without damage to the electrical box or its wiring contents.

BACKGROUND OF THE INVENTION

Electrical boxes are typically used to hold electrical outlets, switches, and the terminal portions of related wires in the walls of residential and commercial buildings. Electrical boxes are also used to provide mounting locations and wiring connections for fans and other electrical appliances. Electrical boxes are manufactured in a variety of sizes. They are in practice commonly fastened to structural members, such as metal or wooden studs, forming the walls of the building.

A duplex-sized electrical box 10 is shown in FIG. 1 mounted to a stud 16. As is typical, the electrical box 10 has a rear wall and four side walls that cooperate to define an open inner volume. The electrical box 10 has a front opening 12. Once electrical wires 14 are installed, terminal portions of the wires 14 are disposed within the open inner volume of the box 10, potentially protruding through the front opening 12 of the electrical box 10. For wall mounting, electrical boxes 10 may, by way of non-limiting examples, be duplex sized, quad sized, 3-gang, or occasionally even larger.

Normally, wallboard is mounted over the structural members to close the wall and to act as a surface material. It is necessary to cut openings in the wallboard sheets in accurate alignment with the electrical boxes 10. However, in doing so, care must be taken to avoid damage to the electrical box 10 or the wiring 14 within and leading to the electrical box 10.

One strategy for producing an accurately located hole in the wallboard is to measure the location of the electrical box 10 relative to the planned placement of the wallboard sheet and then to pre-cut an opening in the wallboard sheet. However, such measuring is cumbersome. If the measurements are in error, the cut hole is misaligned, and the wallboard sheet is ruined. To avoid this, it is often seen as more efficient to attach the sheet of wallboard over the electrical box 10 and then use a cutting device, such as a utility knife or a rotary power tool, to cut away the wallboard over the electrical box 10. Unfortunately, this method still leaves risk of misalignment or other incorrect cutting, which would require repair or replacement of the wallboard. Even worse, there is a substantial risk of accidentally cutting or damage to the electrical wires 14, which entails still greater repair expense and inconvenience.

A number of tools and templates have been disclosed by the prior art with the goal of making the cutting of electrical box openings in wallboard more accurate and efficient. One such prior art device for locating electrical boxes to facilitate the accurate cutting of openings during wallboard installation is taught in U.S. Pat. No. 7,432,444, entitled Temporary Protective Cover for an Electrical Box. There, a temporary protective cover is applied over an electrical box, and a protruding pin extends from the protective cover. When the wallboard is mounted over the electrical box, the protruding pin indicates the location of the box by forming a bump in the wallboard. Based on the indicated location of the box, an opening can be cut in the wallboard approximately corresponding with the shape and location of the electrical box. There are further, substantially similar, guides and templates disclosed by the prior art.

However, even with such guides, cutting openings in the wallboard presents several challenges and risks. For instance, if a utility knife is used, there is considerable variation in the accuracy of the opening depending on the skill of the user and the sharpness of the blade. In this regard, it is recognized that wallboard material typically dulls cutting blades very quickly. Moreover, even with a dull blade, slipping with a utility knife can cause serious hand injuries, damage to electrical wiring, or both. Where a rotary cutter is used, the quality of the result again depends largely on the skill of the user, and rotary cutters have their own potential for user injuries and wire damage. In any case, the cutting of openings in wallboard using prior art guides and templates remains a time consuming and laborious task.

Other known prior art cutting devices employ guide pins that are received into the screw apertures of a typical plastic receptacle box to guide in the application of a cutting plate that has four cutting blades disposed in a rectangular configuration. The cutting plate is hammered into the wallboard in an attempt to cause the cutting blades to cut a square opening in the wallboard corresponding to the shape and location of the electrical box. However, such cutting devices have limitations and shortcomings. Most basically, use of the device relies on hammering the cutting plates and blades with sufficient force to cut through the wallboard. This applies substantial localized pressure, which can dent and otherwise damage the wallboard. Moreover, effective cutting relies on the cutting blades being sharp, and sharpening the blades is of limited practicability. With that, the performance of the tool will invariably degrade, and the likelihood of damage to the wallboard is increased. Even further, such cutters have limited utility to electrical boxes that do not have front nailing bars or other hardware extending beyond the perimeter of the box that would be likely to be impacted by the cutting blades to damage them and impair their operation.

In light of the foregoing, it is apparent that there is a need in the art of wallboard installation for a device that permits the cutting of openings in wallboard for electrical boxes of substantially any type and configuration accurately and efficiently with minimized risk of injury to the user.

SUMMARY OF THE INVENTION

With an appreciation for the state of the art and the real needs summarized above, the present inventor set forth with the basic object of providing an improved device for assisting in the cutting of wallboard openings for electrical boxes. A more particular object of the invention is to provide a device for assisting in the cutting of wallboard openings for electrical boxes that permits the openings to be created with accuracy and with minimized risk of injury to the user in a rapid and efficient manner. A related object of the invention is to provide a device for assisting in the cutting of wallboard openings for electrical boxes that produces accurate and consistent openings without reliance on significant expertise of the user. A further object of the invention is to provide a device for assisting in the cutting of wallboard openings for electrical boxes that substantially eliminates the risk of damage to electrical wiring. Yet another object of embodiments of the invention is to provide a device for assisting in the cutting of wallboard openings for electrical boxes that is durable, that exhibits a reduced likelihood of damage to surrounding wallboard, and that is applicable to electrical boxes of a variety of types.

The foregoing and further objects and advantages of embodiments of the invention will become obvious not only to one who reviews the present specification and drawings but also to one who has an opportunity to make use of the device for assisting in the cutting of wallboard openings for electrical boxes as disclosed herein. It will be appreciated, however, that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the invention.

In carrying forth one or more of the foregoing objects, one embodiment of the cutting device for assisting in the cutting of wallboard openings for electrical boxes is founded on a base frame. A plurality of spikes project from the base frame in a spike pattern, and the spike pattern defines a periphery of an opening to be cut in wallboard. Under this construction, the spikes perforate the wallboard in the spike pattern when the spikes are driven into the wallboard. As used herein, the periphery of the opening defined by the spike pattern need not be continuous.

In certain embodiments, the base frame has an outer face and an inner face, and the spikes project from the inner face of the base frame. Each of the plurality of spikes can have a shank, and the shank of each of the plurality of spikes can pass through the base frame. The plurality of spikes could be fixed in relation to the base frame, or the spikes could be slidably engaged with the base frame such that the spikes could be actuated individually or in groups.

Particular cutting devices as taught herein can, for example, have a spike pattern that is generally rectangular. It will again be noted that the spike pattern need not be continuous such that, for instance, the generally rectangular pattern could have one or more gaps along the periphery, such as at the corners of the rectangular spike pattern. In a rectangular spike pattern, for example, the spike pattern can have upper and lower series of spikes disposed in generally parallel upper and lower lines and first and second lateral series of spikes disposed in generally parallel lateral lines.

At least some adjacent spikes within the spike pattern can be closely spaced. In one such example and where the spike pattern is generally rectangular, there can be at least ten spikes in each of the first and second lateral series of spikes. So disposed, the spikes perforate the wallboard in the spike pattern when the spikes are driven into the wallboard.

Each of the plurality of spikes can be considered to have an effective maximum lateral dimension. A distance between adjacent spikes within the spike pattern can then be less than the effective maximum lateral dimension of each of the plurality of spikes. For example, the spike pattern can have plural spikes disposed in series along a line, and the effective maximum lateral dimension can be measured along the line. The line can, but need not be, straight, or the line could be curved, such as in a rounded spike pattern.

In particular embodiments, the spikes have generally round shanks with an effective lateral dimension comprising an effective diameter of the spike shanks and wherein the distance between the shanks of adjacent spikes within the spike pattern is less than the effective diameter of the spike shanks. The shank of each spike can have a sharp formation to assist in cutting through the wallboard. The sharp formation could, for example, include a helical formation.

A registration and alignment guide can be retained by the base frame. For example, the registration and alignment guide can comprise one or more apertures in the base frame. In particular embodiments, the registration and alignment guide comprises one aperture substantially centered laterally and longitudinally on the base frame.

The cutting device can further include a cover for being selectively retained relative to an electrical box. A registration and alignment guide can be retained by the cover, and a registration and alignment guide can be retained by the base frame for selectively engaging the registration and alignment guide retained by the cover. For example, the registration and alignment guide retained by the cover can be at least one protruding pin, and the registration and alignment guide retained by the base frame can be at least one aperture in the base frame for selectively engaging the at least one protruding pin.

In certain practices of the invention, a guide post can further be provided, the guide post having an aperture, such as a borehole, for slidably receiving the at least one protruding pin. The guide post can be sized for being slidably received through the at least one aperture in the base frame. Further, the cutting device could include a hole cutter for cutting a hole in wallboard surrounding the at least one protruding pin. The hole cutter can have an aperture for slidably receiving the at least one protruding pin, and the hole cutter can have a cutting formation at an end thereof for cutting wallboard surrounding the at least one protruding pin.

One will appreciate that the foregoing discussion broadly outlines the more important features of the invention merely to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

The device for assisting in the cutting of wallboard openings for electrical boxes disclosed herein is subject to a wide variety of embodiments, each with the object of enabling the cutting of wallboard openings for electrical boxes accuracy and with minimized risk of injury to the user in a rapid and efficient manner. To ensure that one skilled in the art will be able to understand and, in appropriate cases, practice the present invention, certain preferred embodiments of the broader invention revealed herein are described below and shown in the accompanying drawing figures.

Figure 1:
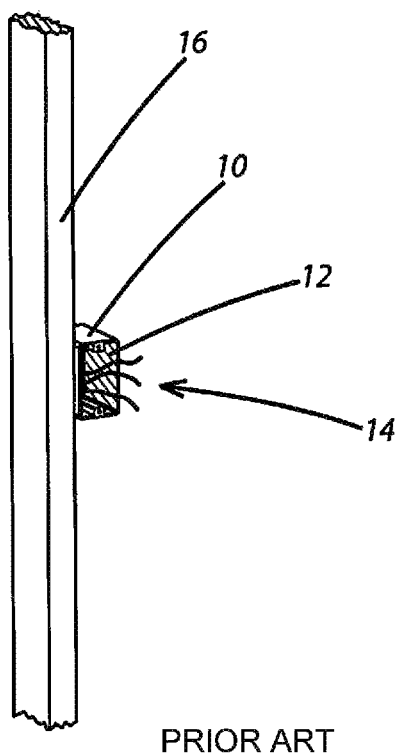
FIG. 1 is a perspective view of an electrical box retained relative to a stud.
Figure 2:
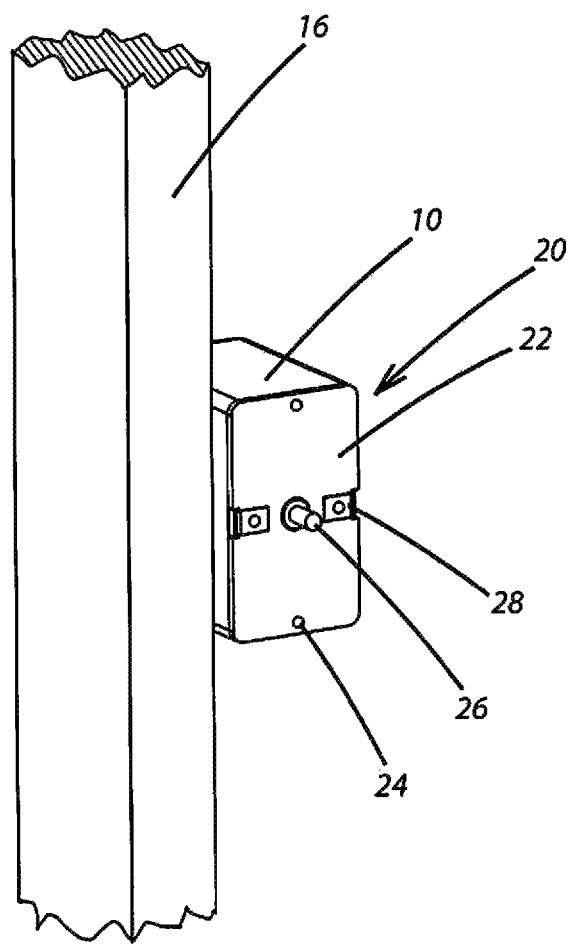
FIG. 2 is a perspective view of the electrical box with a locating cover mounted according to the present invention.

Looking more particularly to the drawings, FIG. 2 depicts a stage in facilitating the cutting of a wallboard opening wherein a protective cover 20 is installed to cover the front opening of an electrical box 10. The protective cover 20 includes a cover plate 22 that is retained relative to the electrical box 10, such as by mounting fasteners or pins 24, retaining spring clips 28 that bear against the lateral side walls of the box 10, or by some other retention mechanism or combination thereof. A protruding pin 26 protrudes centrally from the cover plate 22. In addition to protecting the inner volume of the electrical box 10 and the contents thereof during cutting of wallboard, the protective cover 20 offers protection once the wallboard has been cut away around the electrical box 10, including by keeping plaster and other material and debris from entering the electrical box 10 and complicating the later installation of plugs, switches, and other wiring devices.

Figure 3:
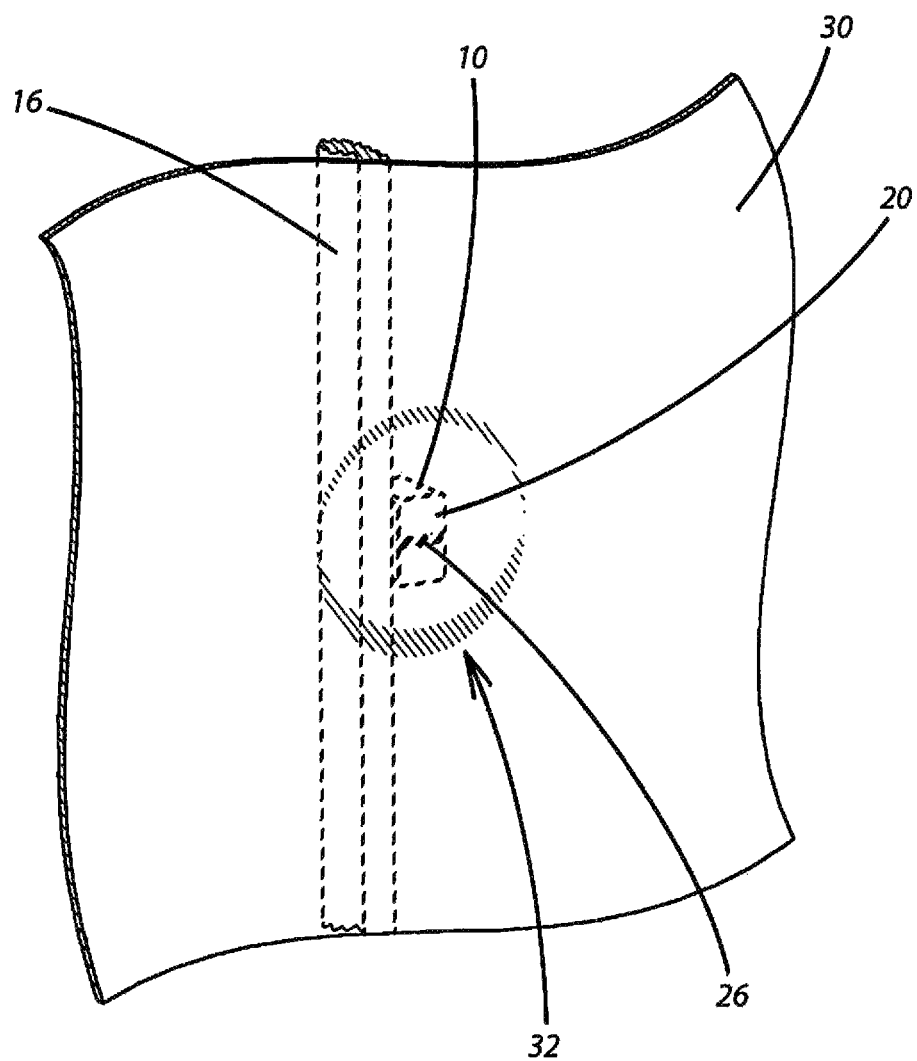
FIG. 3 is a perspective view of a panel of wallboard applied over the locating cover, stud, and electrical box.
Figure 4:
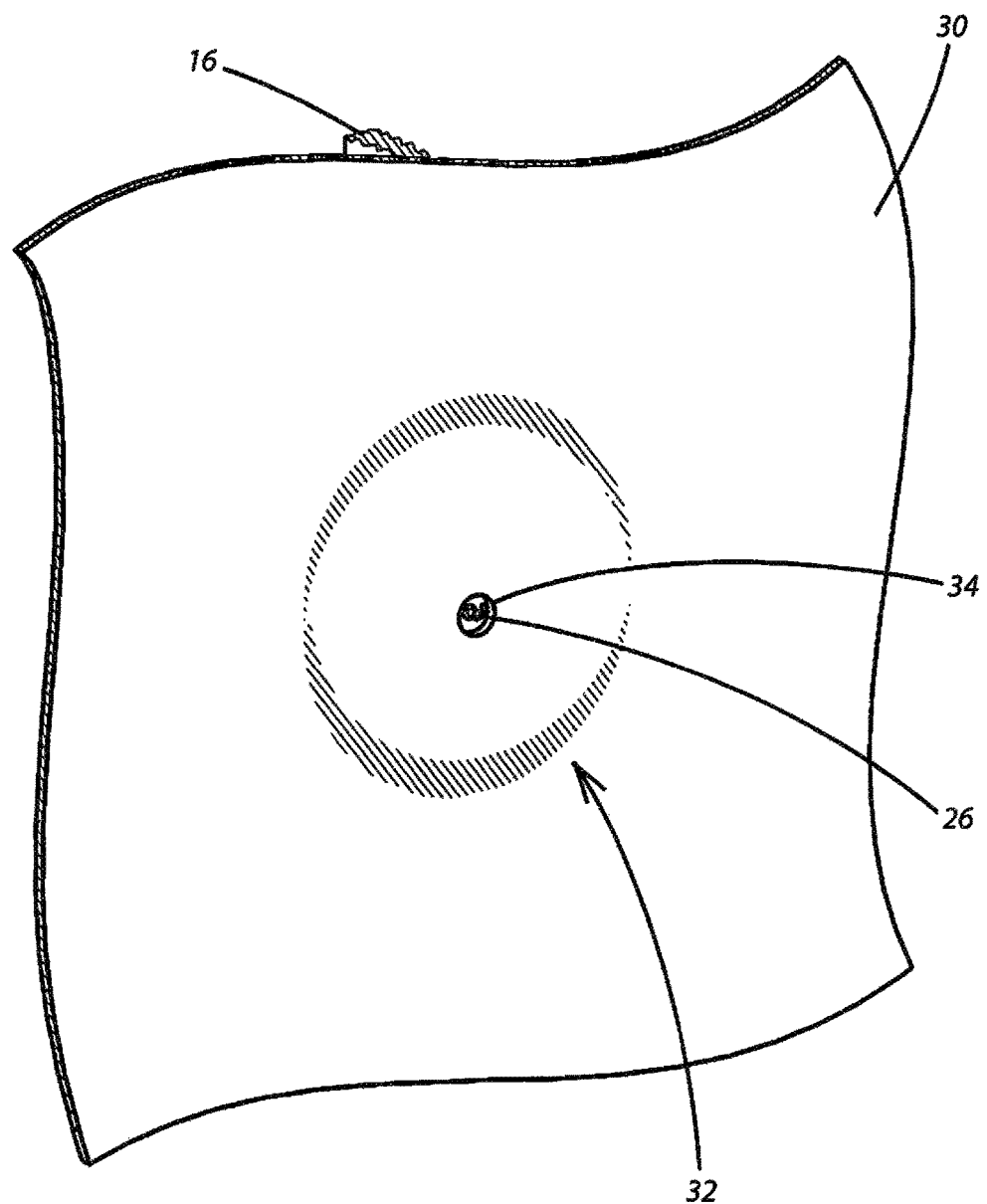
FIG. 4 is a perspective view of the panel of wallboard applied over the locating cover, stud, and electrical box with a hole cut therein around a protruding pin of the locating cover.

When a sheet of wallboard 30 is installed over the stud 16, the electrical box 10, and the protective cover 20 as shown in FIG. 3, the protruding pin 26 tends to cause a protuberating bulge 32 in the sheet of wallboard 30. Using the bulge 32 as an indication of the location of the electrical box 10, a hole 34 can then be cut around the protruding pin 26 as in FIG. 4, for example. With that, the sheet of wallboard 30 can assume a flat configuration in fully contact with, for instance, the underlying studs 16. With the protruding pin 26 thus permitted to protrude through the sheet of wallboard 30, the proper location for cutting the opening in the wallboard 30 for the electrical box 10 can be fully located based on the known position of the protruding pin 26 in relation to the electrical box 10.

Figure 5:
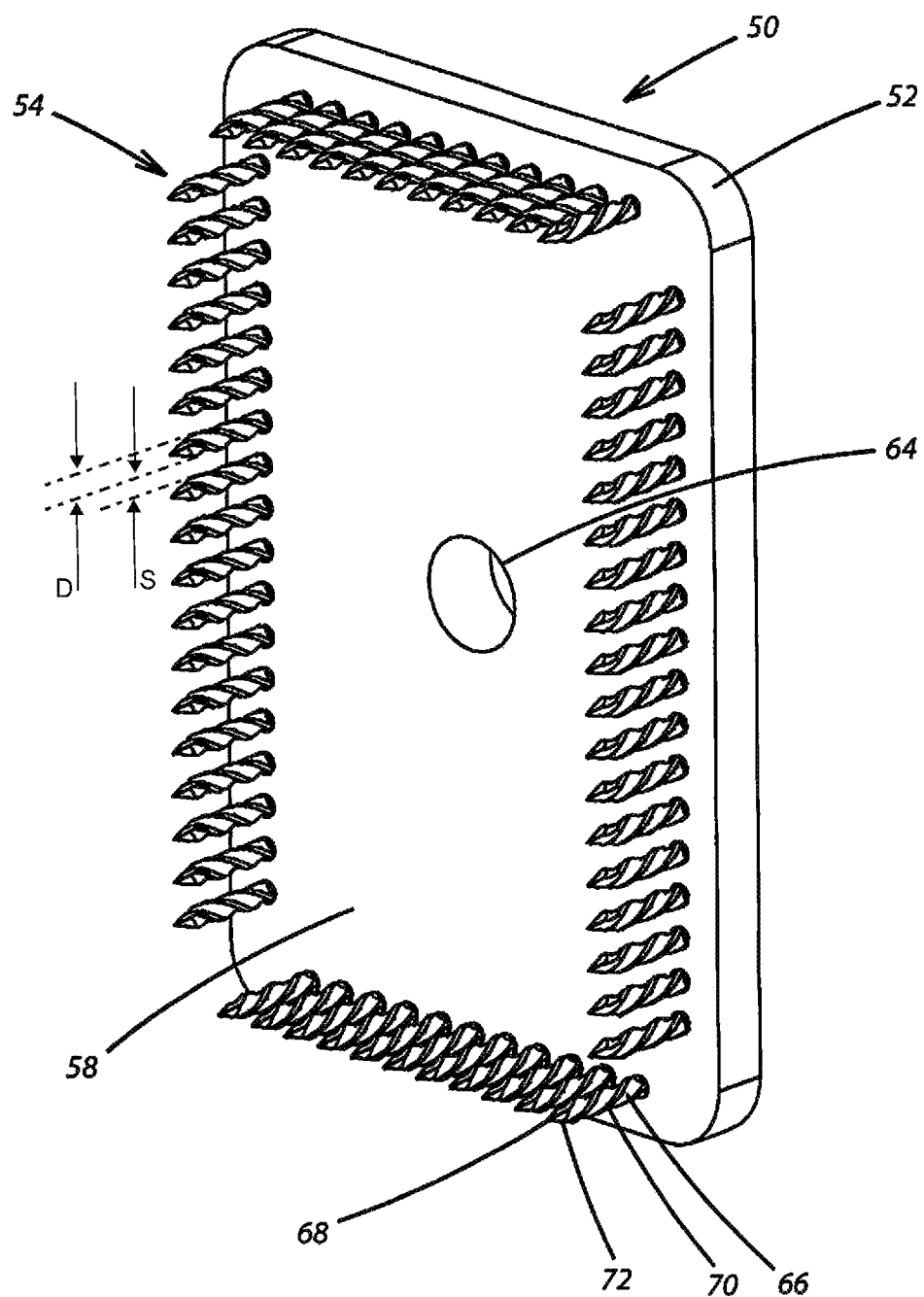
FIG. 5 is a perspective view of an embodiment of the wallboard cutting device disclosed herein.
Figure 6:
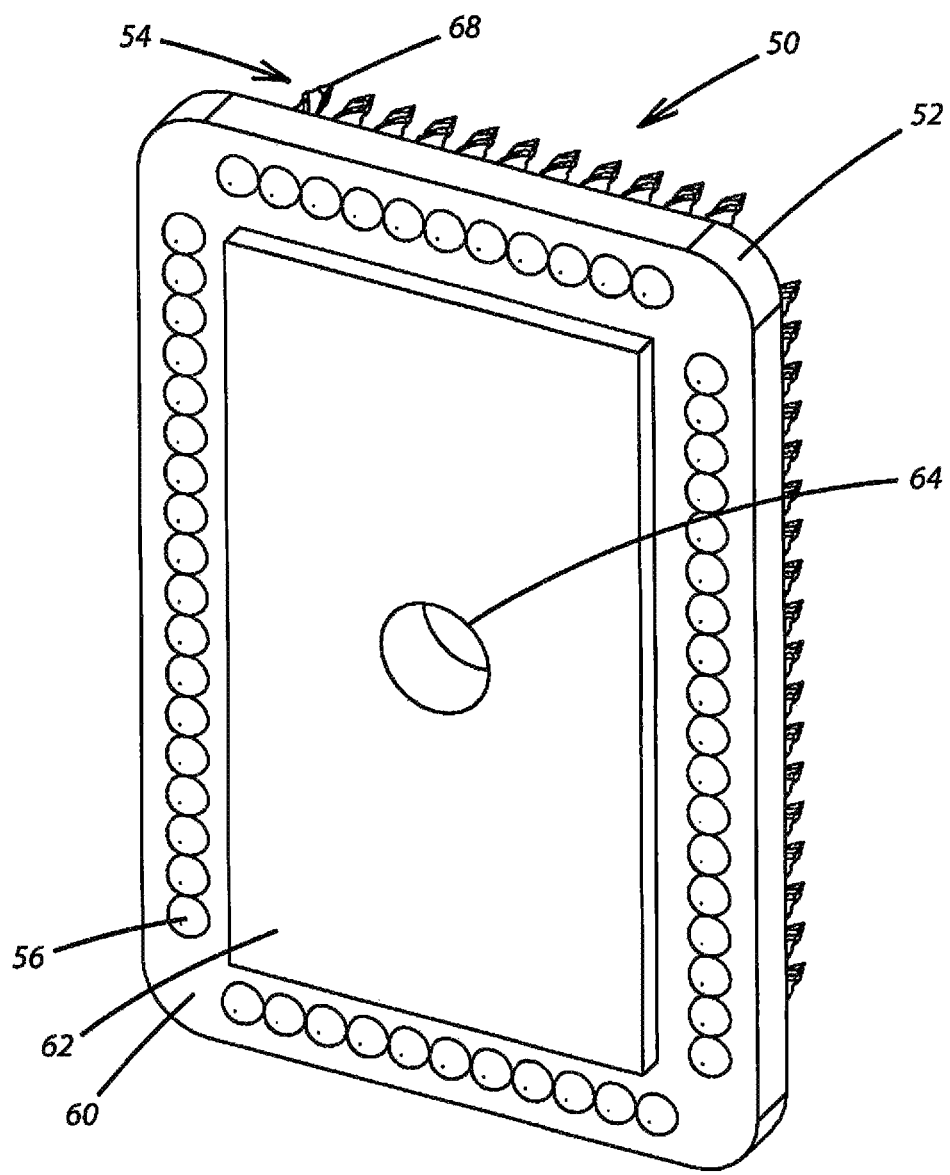
FIG. 6 is an alternative perspective view of the embodiment of the wallboard cutting device of FIG. 5.

Looking further to FIGS. 5 and 6, an embodiment of a wallboard cutting device 50 according to the present invention is shown. The wallboard cutting device 50 is configured to engage and align with the protective cover 20 using the protruding pin 26 as a registration and alignment guide. Other registration and alignment guides will readily occur to one skilled in the art after reviewing the present disclosure. By way of example and not limitation, multiple protruding pins 26 could be employed as could any other member, sensor, or indicator operative to enable registration and alignment of the wallboard cutting device 50 with an electrical box 10.

In the depicted embodiment, the wallboard cutting device 50 has a frame 52, which may alternatively be referred to as a base member 52, comprising a generally rectangular plate with an outer face and an inner face. The base member or frame 52 can be formed unitarily or from multiple components. A plurality of spikes 54 project from the inner face of the base member 52 in a pattern. The spikes 54 could be integrally formed with the base member 52. Alternatively, the spikes 54 could be separately formed and retained by the base member 52, such as by having shank portions 66 that pass through apertures in the base member 52.

In this embodiment, the spikes 54 are disposed in a generally rectangular pattern passing through a pattern of correspondingly disposed apertures. Upper and lower series of spikes 54 and apertures are disposed in generally parallel upper and lower lines, and first and second lateral series of spikes 54 and apertures are disposed in generally parallel lateral lines. The spikes 54 and the receiving apertures in this example are spaced in a rectangular pattern corresponding in shape and size to the shape and size of the electrical box 10 to be accommodated with it being understood that the referenced correspondence in shape and size could entail a pattern slightly larger than, slightly smaller than, or approximately equal to the dimensions of the opening in the electrical box 10 or the spacing of the walls of the electrical box 10. It should be understood that other patterns could be defined depending on the application, each being within the scope of the invention except as it is expressly limited by the claims.

Adjacent spikes 54 within each line of spikes 54 are closely spaced. For instance, the spikes 54 and the receiving apertures can be spaced so that the spacing between adjacent spikes 54 is less than the broadest effective lateral dimension of each spike along the line of spikes 54. Where the spikes 54 are generally round as in this example and wherein the spikes 54 are disposed in series along a line, the line happening to be straight in this example, the spacing S between adjacent spikes 54 can be less than the effective diameter D of each spike 54 along the line as shown in FIG. 5. As used herein, the effective diameter D of each spike 54 comprises the diameter of the spike 54 as established by the protruding portion of the shank 66 of each spike 54, including any threads or other formations therealong. To illustrate the closeness of the spacing of the spikes 54 in the upper and lower series and the first and second lateral series, the spikes 54 in the depicted, non-limiting embodiment, which might be applicable to single-gang electrical boxes 10, are disposed with eighteen spikes 54 in each of the lateral series and eleven spikes 54 in each of the upper and lower series.

The heads 56 of the spikes 54 can be touching or nearly touching as can be seen, for instance in FIG. 6.

One or more registration and alignment apertures or guide holes 64 or other registration and alignment guide or guides is disposed in the wallboard cutting device 50. Here, with the protruding pin 26 being centrally disposed on the protective cover 20 and thus in relation to an electrical box 10, a registration and alignment aperture 64 is centered vertically and laterally in the base member 52. As shown and described further herein, the registration and alignment aperture 64 can matingly receive the protruding pin 26 thereby to permit an accurate registration and alignment of the wallboard cutting device 50 with the protective cover 20 and thus the electrical box 10.

With combined reference to FIGS. 5 and 6, for example, each spike 54 can include a head 56 disposed in contact with the outer face 60 of the base member 52 while the shank portion 66 of each spike 54 projects through and beyond the inner face 58 of the base member 52. The outer face 60 includes an outer boss 62. The outer boss 62 projects from the outer face 60 of the base member 52 by a distance greater than the distance by which the heads 56 of the spikes 54 project.

Each spike 54 thus has a shank body 66 proximally anchored in the base member 52, and each spike 54 has a distal point 68 with a portion of the shank body 66 projecting from the inner face 58 of the base member 52. The shank body 66 and the point 68 of each spike 54 are preferably formed with cross-sectional shapes having relatively sharp corners. The shank body 66 preferably incorporates a plurality of twists 70, and the point 68 preferably incorporates a plurality of facets 72. The twists 70 can be disposed in a generally helical formation. The spikes 54 in this example are generally round in cross section but with the above-described twists 70 and facets 72 and other sharp corners, but spikes 54 with other shapes are within the scope of the invention, except as it might be expressly limited by the claims.

Figure 7:
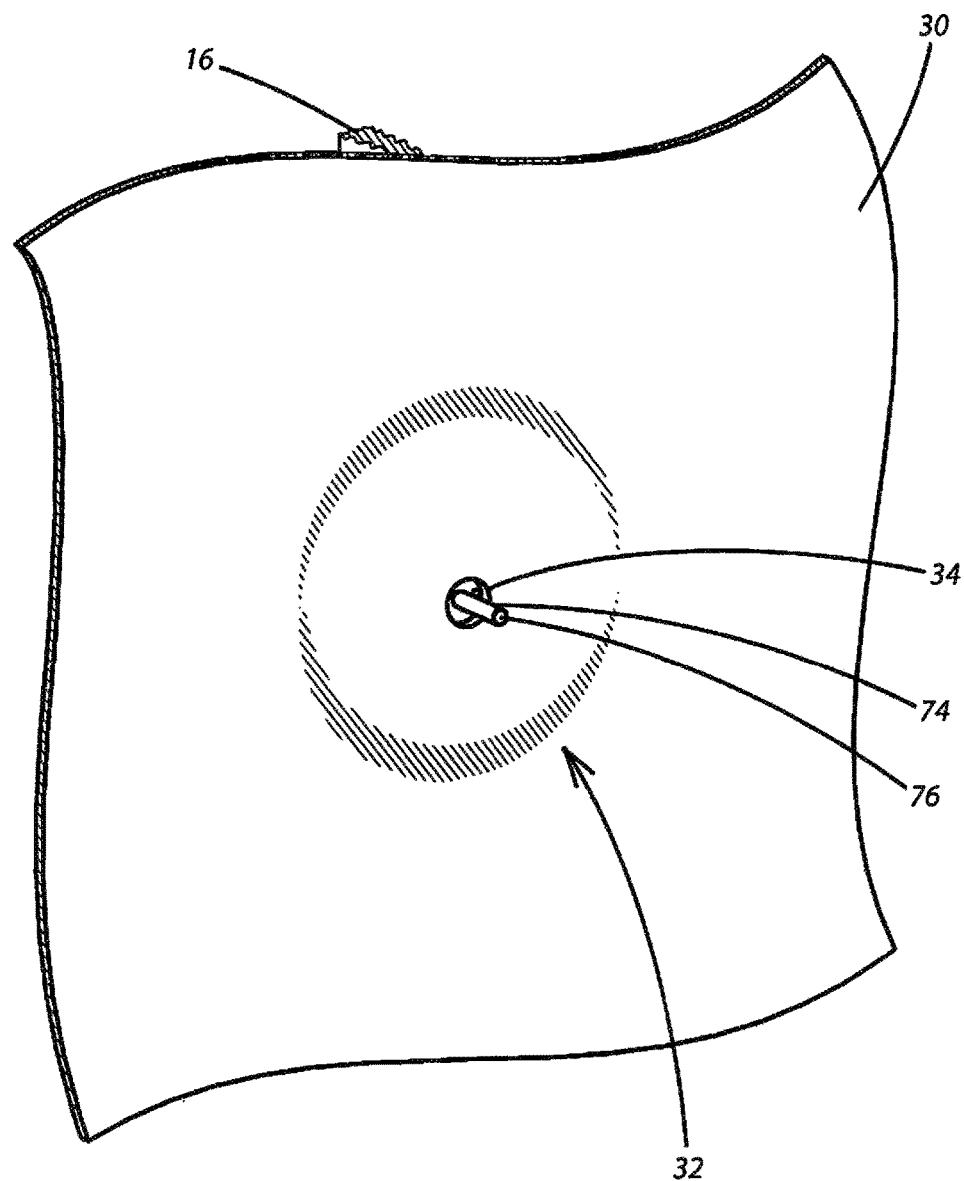
FIG. 7 is a perspective view of a guide post retained relative to an electrical box for guiding the wallboard cutting device as disclosed herein.

In certain practices of the invention, as shown in FIG. 7 for example, a guide post 74 with a cylindrical, sleeve-like structure can be fitted over the protruding pin 26 once a hole 34 has been cut around the protruding pin 26. The guide post 74 is preferably dimensioned to have a sliding fit inside the aperture 64 of the wallboard cutting device 50. The guide post 74 also has a center hole 76, which may be a thru-hole as shown or a blind hole, configured to have a sliding fit over the protrusion pin 26.

Figure 8:
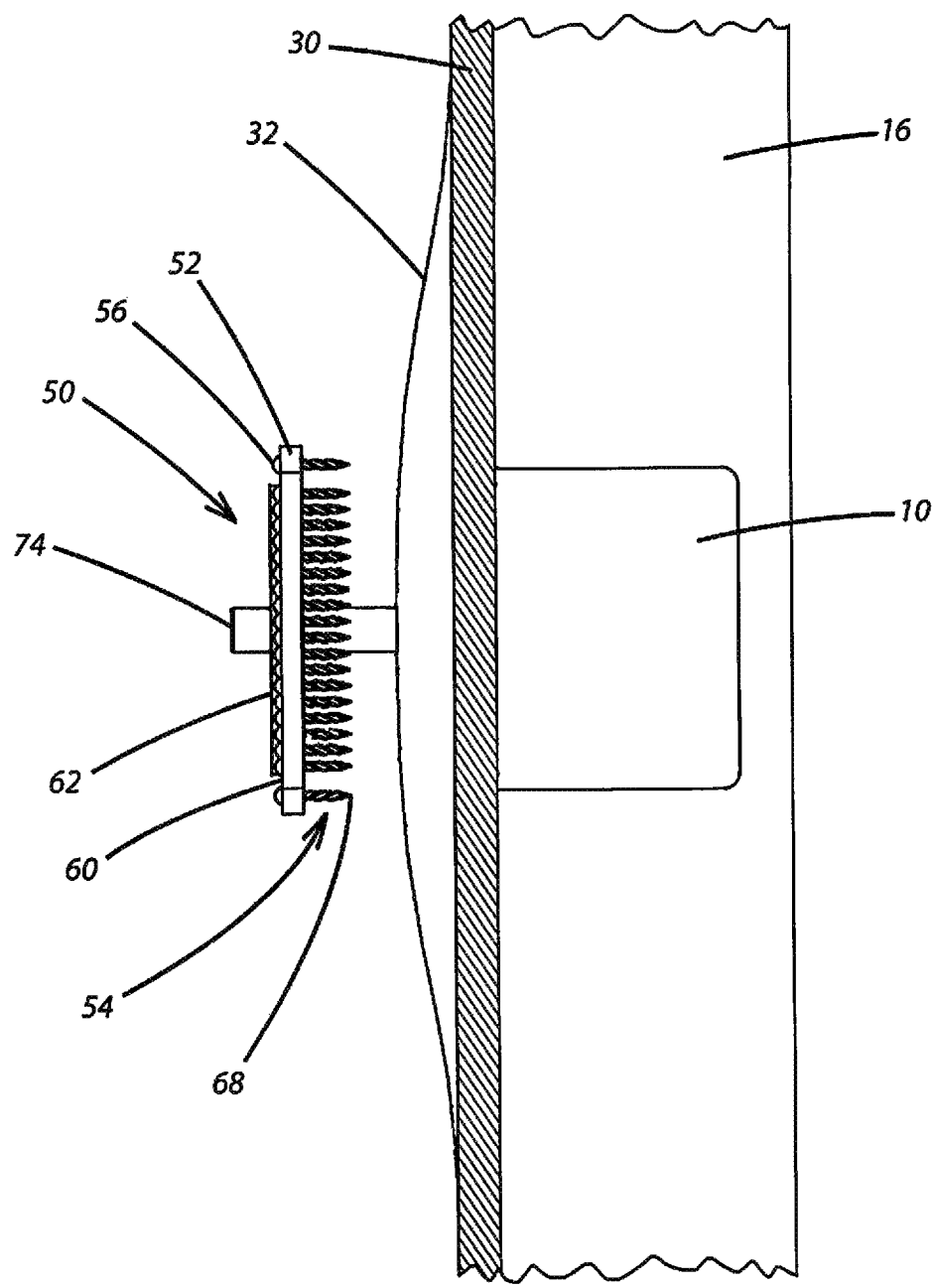
FIG. 8 is a partially sectioned view in side elevation of the wallboard cutting device applied over the guide post prior to cutting an opening in wallboard in accordance with the disclosed invention.
Figure 9:
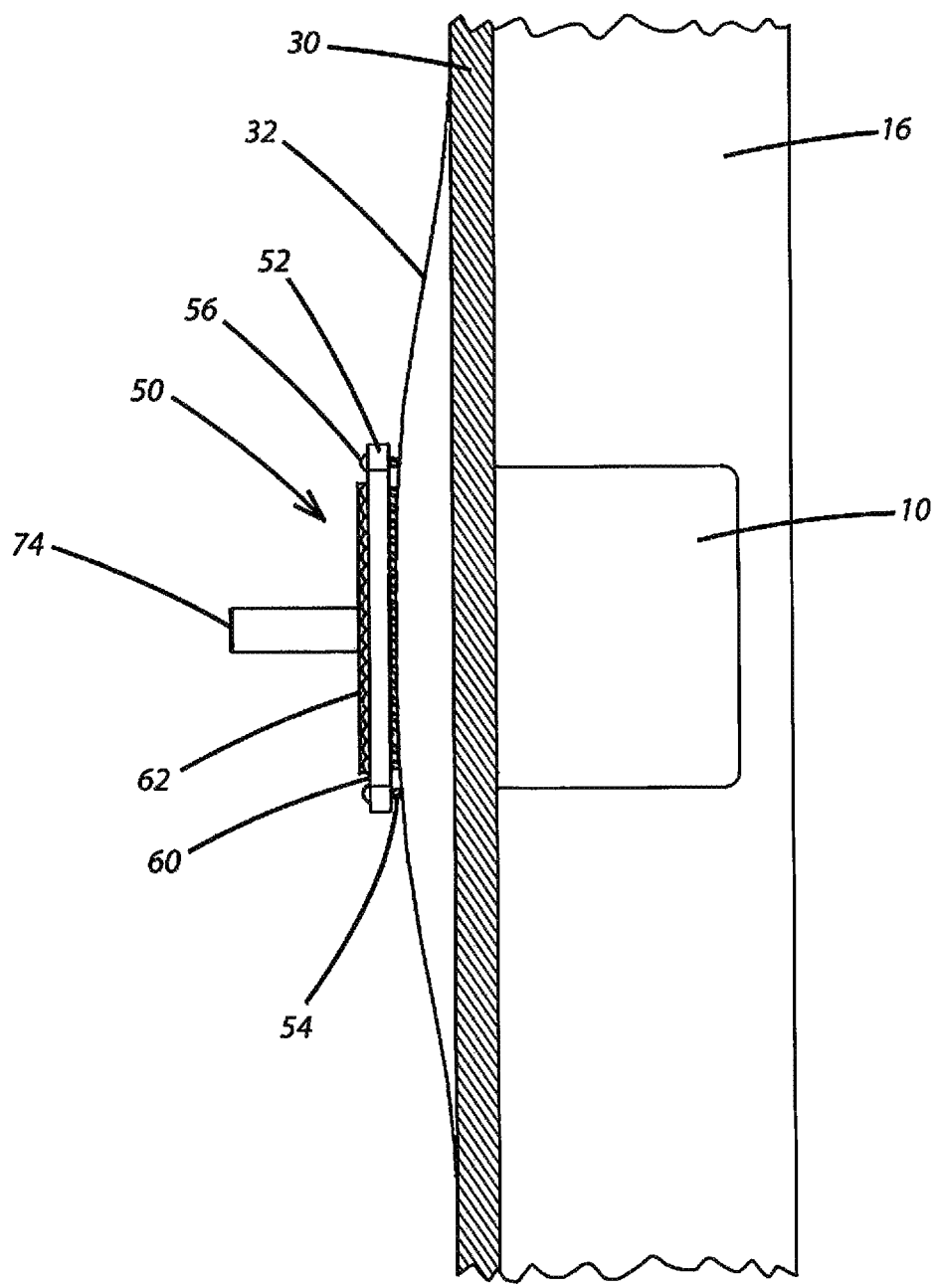
FIG. 9 is a partially sectioned view in side elevation of the wallboard cutting device with the cutting spikes thereof driven into the wallboard for cutting an opening therein.
Figure 10:
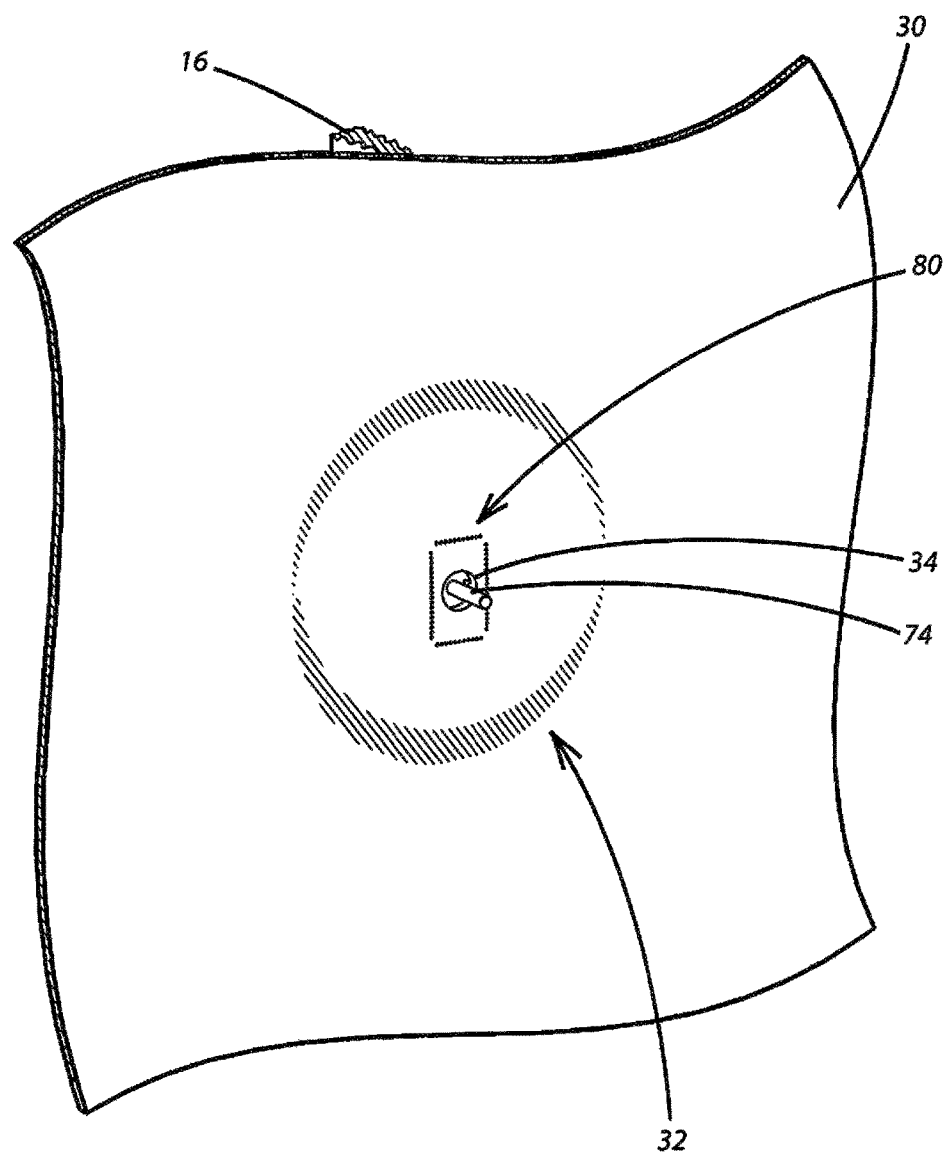
FIG. 10 is a perspective view of the panel of wallboard with a pattern of cutting perforations formed therein by the wallboard cutting device.

As shown in FIG. 8, the guide hole 64 of the wallboard cutting device 50 can be fitted over the guide post 74 and thus the protruding pin 26 within the guide post 74 with the spikes 54 facing the wallboard 30. The pattern of the spikes 54 is rotationally oriented to align with the shape and orientation of the electrical outlet 10. Once the wallboard cutting device 50 is properly oriented and with the spike points 68 in contact with the wallboard 30, the outer face 60 or the outer boss 62 of the wallboard cutting device 50 and thus the wallboard cutting device 50 generally is driven into the wallboard 40, such as by hammering, to drive the spikes 54 into and potentially through the wallboard 30 as shown in FIG. 9. The spikes 54 are fixed in relation to the base member 52 so that the base member 52 and the several spikes 54 move in uniformity. The pattern of spikes 54 thus produces a corresponding, rectangular pattern of perforations 80 in the wallboard 30 as shown in FIG. 10.

Figure 11:
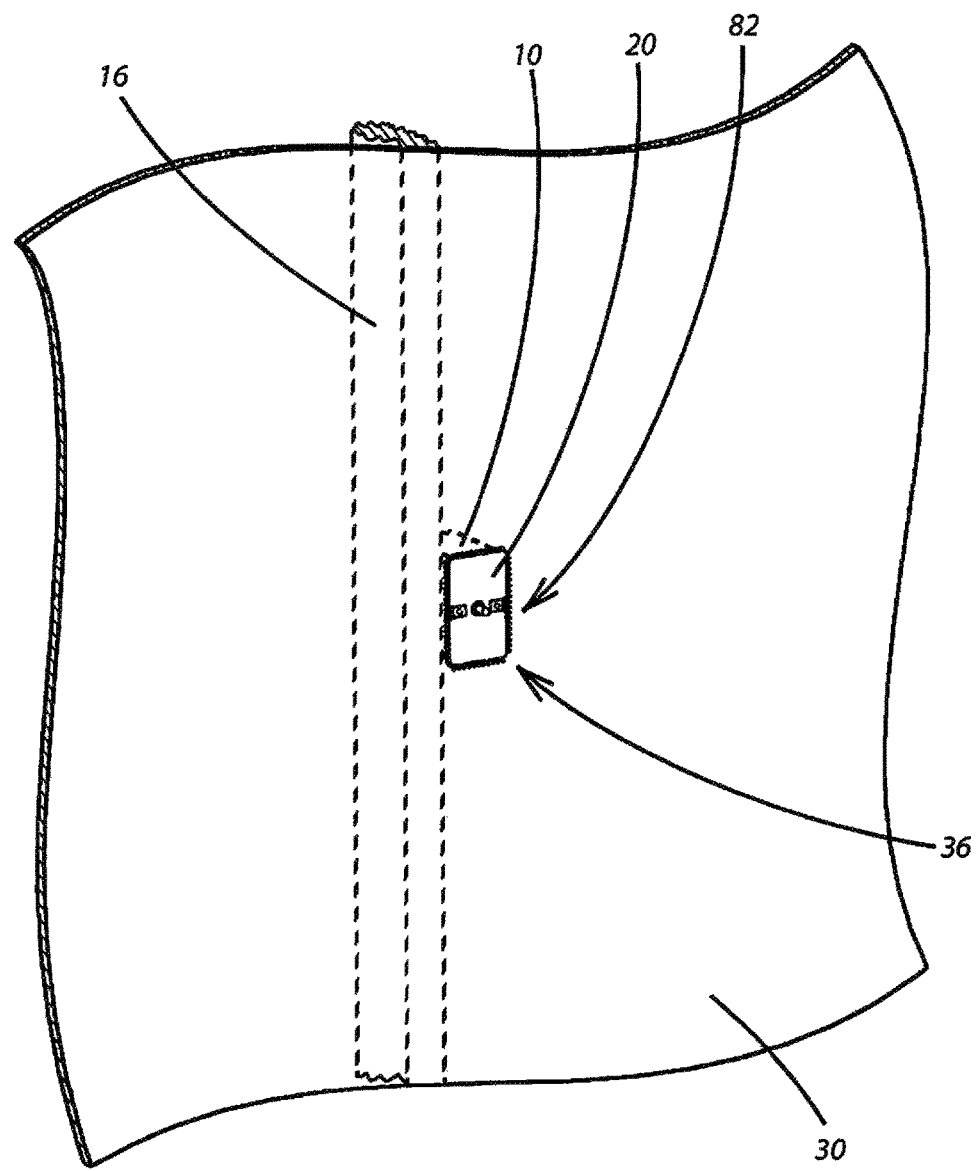
FIG. 11 is a perspective view of the panel of wallboard pressed into a flat configuration with the pattern of cutting formations defining an opening in the panel of wallboard.

The rectangular pattern of perforations 80 corresponds to the pattern of the spikes 54 and thus to the shape and size of the electrical box 10. With that, the perforations of the pattern of perforations 80 can be readily connected, such as by snapping or cutting the interposed segments of wallboard 30 or otherwise causing the perforations 80 to connect to define a rectangular opening 36 in the sheet of wallboard 30 in accurate correspondence to the location, shape, and size of the electrical box 10. Indeed, pressing the wallboard 30 into full contact with the underlying substructure may cause the perforations 80 to connect automatically to produce the opening 36. The portion of wallboard 30 bordered by the pattern of perforations 80 can be readily removed to expose the cover 20 and the electrical box 10. The opening 36 in the wallboard 30 is thus cut accurately, easily, and safely. The electrical box 10 is readily accessed through the sheet of wallboard 30, and the sheet of wallboard 30 is permitted to lie flat around the electrical box 10 as shown in FIG. 11 where the pattern of connected perforations 82 can be seen around the edges of the opening 36 in the sheet of wallboard 30.

The sharp, spiraling angular shape of the spikes 54 aids in puncturing the sheet of wallboard 30, as do the point facets 72. The outer boss 62 provides a convenient surface for hammering against and can prevent damage to the heads 56 of the spikes 54. The spikes 54 are preferably made of hard, durable material, such as hardened alloy steel, to maintain their shape and sharp points. Any other suitably hard, tough, and impact-resistant and shape-retaining material is seen as being within the scope of the invention. The frame 52 is preferably made of a strong, impact-resistant and light material, such as aluminum, although materials such as steel, other metals, suitably engineered or reinforced plastics, or any other suitable material or combination thereof are also within the scope of the invention.

Within the scope of the invention, the wallboard cutting device 50 may also include a boss (not shown) on the inner face 58. Such an inwardly facing boss can serves to limit the depth of penetration of the spikes 54 incrementally. With that, an accessible edge may be provided to facilitate a prying loose of the wallboard cutting device 50.

Figure 12:
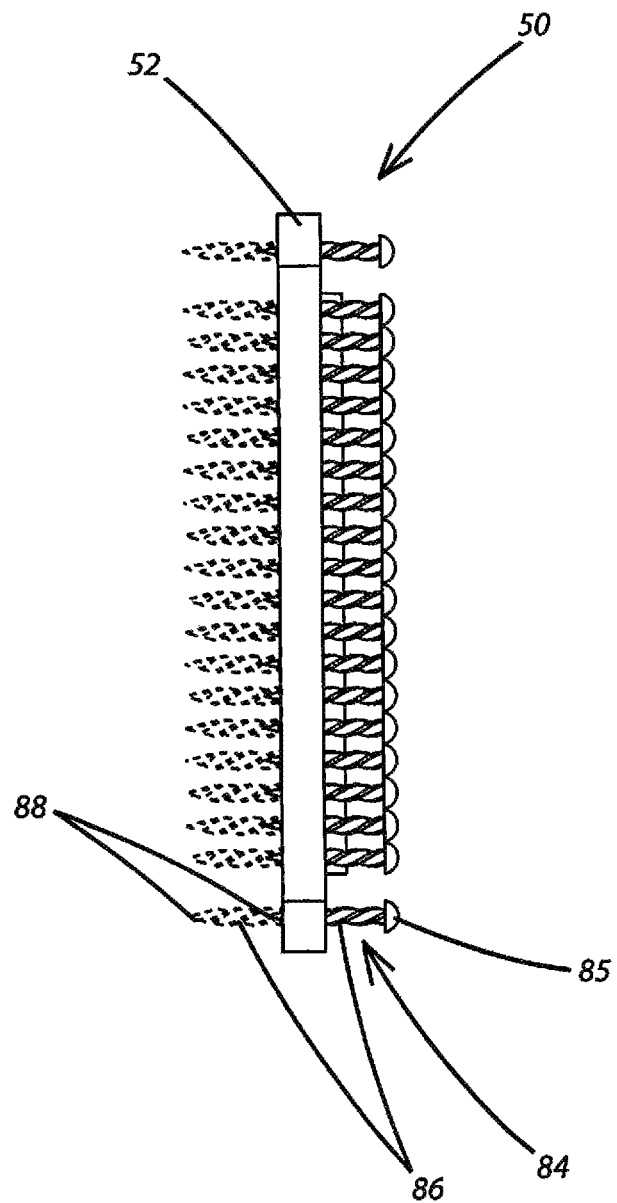
FIG. 12 is a view in side elevation of an alternative wallboard cutting device according to the invention.

In the foregoing embodiment, the spikes 54 comprise fixed spikes that are fixed in relation to the base member 52 so that the base member 52 and the several spikes 84 move in uniformity. However, the alternative embodiment of FIG. 12 employs slidable spikes 84 that are slidably engaged with the base member 52. With that, the base member 52 could be disposed to overlie the area of the wallboard 30 to be cut, such as through an alignment and registration mechanism, and the slidable spikes 84 can be individually or in groups driven into the wallboard 30, such as by a hammering on the heads 85 of the slidable spikes 84. With that, a lower force is required to be applied to the wallboard 30 than is required for hammering all the fixed spikes 54 simultaneously. In FIG. 12, the shanks or bodies 86 and points 88 of the sliding spikes 84 are shown in fully retracted and fully extended positions. The sliding spikes 84 can be configured to slide individually, or they may be linked to slide in groups of two or more, depending for instance on an optimal penetrating force. One skilled in the art will find variations and particular mechanical features that might facilitate the slidability of the spikes 84 individually and in groups within the rectangular frame obvious after reviewing this disclosure. The spikes 84 could be freely removable relative to the base member 52, or a stop mechanism, such as a protuberance along the shank 86, could be provided to prevent each spike 84 from inadvertently falling from the base member 52.

Figure 15:
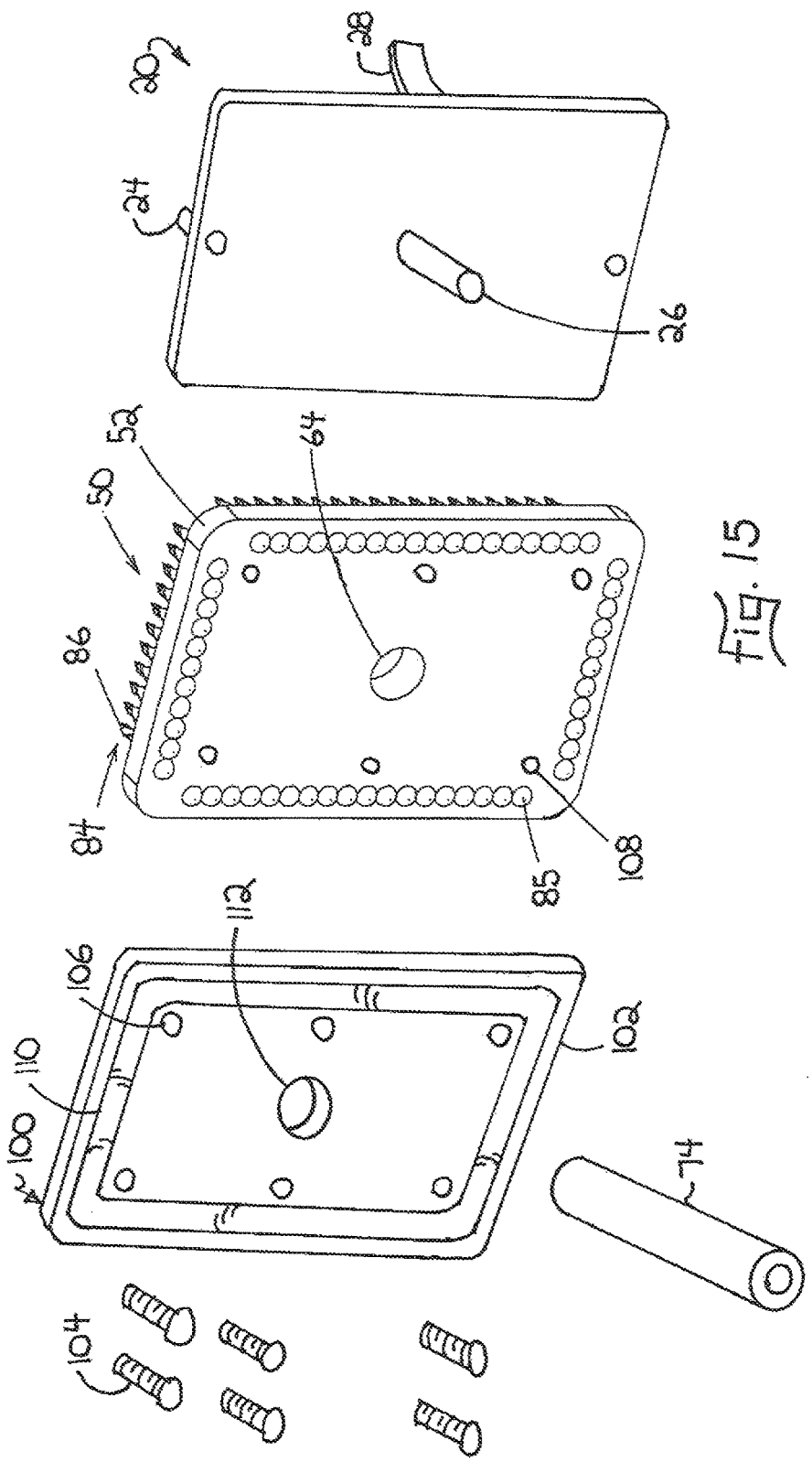
FIG. 15 is a perspective view of a wallboard cutting system with a wallboard cutting device, a locating cover, and a guide post according to a further embodiment of the invention.
Figure 16:
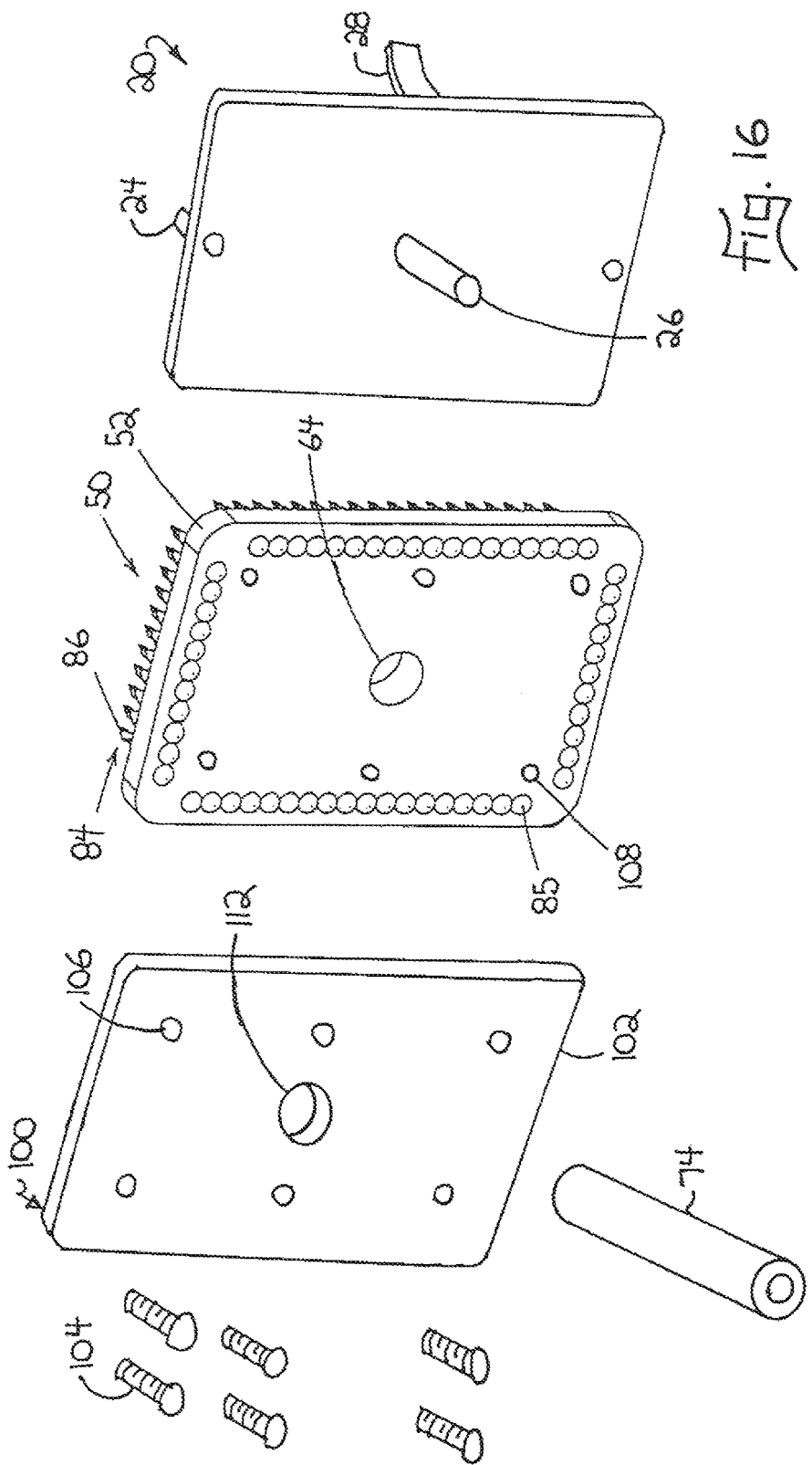
FIG. 16 is an alternative perspective view of the wallboard cutting system of FIG. 15.

The wallboard cutting device 50, the protective cover 20, and, potentially, the guide post 74 can be used in cooperation as a wallboard cutting system. An embodiment of a wallboard cutting system with a cutting device 50 with sliding spikes 84, a protective cover 20, and a guide post 74 is shown in FIGS. 15 and 16. The wallboard cutting device 50 is again configured to engage and align with the protective cover 20 using the protruding pin 26 as a registration and alignment guide. The wallboard cutting device 50 has a base member or frame 52 that again comprises a generally rectangular plate with an outer face and an inner face.

The spikes 84 project from the inner face of the base member 52 in a pattern. The spikes 84 are separately formed and slidably retained by the base member 52, such as by having shank portions that pass through corresponding apertures the base member 52. The apertures and thus the spikes 84 retained thereby are disposed in a generally rectangular pattern. Upper and lower series of spikes 84 and receiving apertures in the base member 52 are disposed in generally parallel upper and lower lines, and first and second lateral series of spikes 84 and receiving apertures in the base member 52 are disposed in generally parallel lateral lines. The spikes 84 in this example are spaced in a rectangular pattern corresponding in shape and size to the shape and size of the electrical box 10 to be accommodated with it being understood that the referenced correspondence in shape and size could entail a pattern slightly larger than, slightly smaller than, or approximately equal to the dimensions of the opening in the electrical box 10 or the spacing of the walls of the electrical box 10. It should be understood that other patterns could be defined depending on the application, each being within the scope of the invention except as it is expressly limited by the claims. Again, adjacent spikes 84 within each line of spikes 84 are closely spaced.

The wallboard cutting device 50, the guide post 74, and the protective cover 20 can be used in cooperation to produce a corresponding, rectangular pattern of perforations 80 in wallboard 30 as shown in FIG. 10. A rectangular opening 36 in the sheet of wallboard 30 can then be readily formed in accurate correspondence to the location, shape, and size of the electrical box 10 as is shown in FIG. 11.

The spikes 84 have heads 85 disposed to the outer face of the base member 52 while the shank portion of each spike 84 projects through and beyond the inner face of the base member 52. Each spike 54 thus has a shank body received through the base member 52 and a distal point with a portion of the shank body projecting from the inner face of the base member 52. The spikes 84 can be formed as shown and described previously. The spikes 84 are slidably engaged with the base member 52.

A backing plate 100 founded on a base member 102 is provided to be selectively retained to overlie the outer face of the base member 52 and the heads 85 of the spikes 84. The base member 102 of the backing plate 100 has an aperture 112 centrally disposed to align with the aperture 64 in the base member 52. The backing plate 100 can be fixed in a facing relationship with the base member 52, such as by threaded mechanical fasteners 104 that pass through apertures 106 in the backing plate 100 to engage threaded apertures 108 in the base member 52. As FIG. 15 shows, a channel 110 is disposed on an inner face of the backing plate 100, the channel 110 having a pattern corresponding to the pattern of the spikes 84 and thus the heads 85 of the spikes 84. With that, the backing plate 100 can be selectively fixed to the base member 52 to overlie the spikes 84 and to retain the spikes 84 in place to prevent each spike 84 from inadvertently falling from the base member 52. However, the backing plate 100 can be selectively removed from the base member 52 so that the spikes 84 can be accessed, such as to be removed and replaced due to wear or damage.

Figure 13:
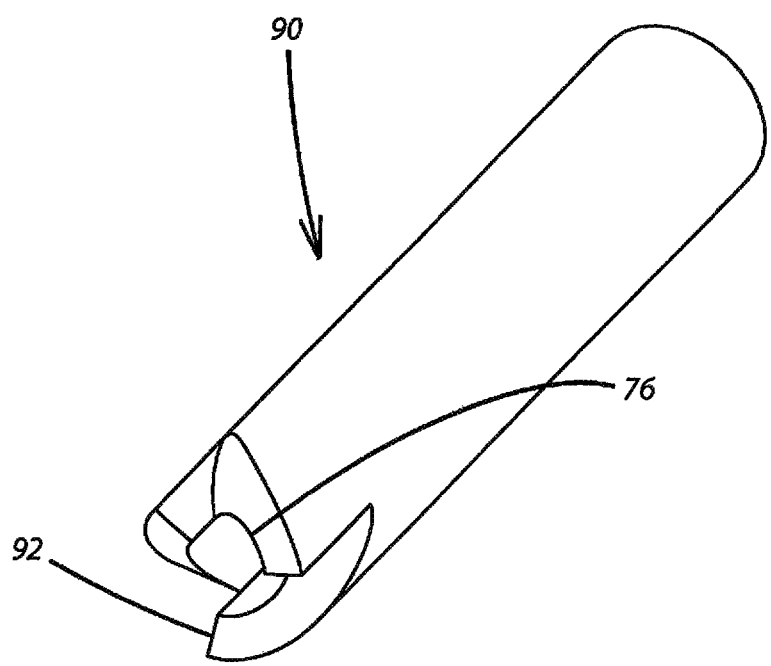
FIG. 13 is a perspective view of a hole cutter as taught herein.
Figure 14:
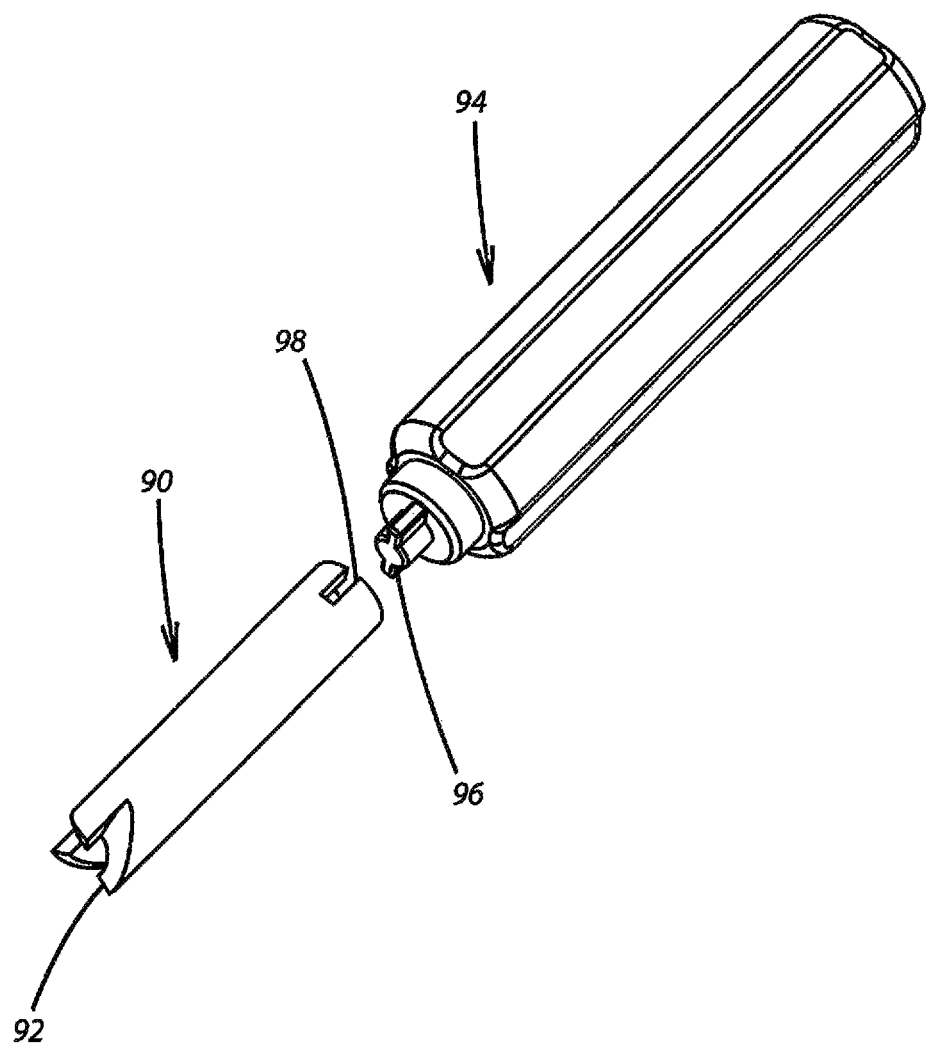
FIG. 14 is a perspective view of a handle for coupling to and driving the hole cutter of FIG. 13.

In certain embodiments, a hole cutter 90 can additionally be employed to cut a hole 34 around the protruding pin 26. One possible hole cutter 90 is shown in FIG. 13. The hole cutter 90 in FIG. 13 is tubular with a central bore 76 for receiving the protruding pin 26. A plurality of cutting edges 92 are disposed at the distal end thereof for cutting a hole 34 around the protruding pin 26 efficiently and safely. During cutting, the cutter 90 can be rotated, such as manually with a handle 94 as in FIG. 14 or by a powered hand tool, such as a rotary driver (not shown). After cutting and with the cutter 90 matingly receiving the protruding pin 26, the cutter 90 may serve as a guide for the wallboard cutting device 50 by being received through the aperture 64. In certain practices, the cutter 90 may be reversed after cutting to avoid possible damage to the protective cover 20 and to afford incrementally more contact area between the central bore 76 in the cutter 90 and the protruding pin 26.

Where a handle 94 is employed as in FIG. 14, handle drive features 96 can be provided to mate with guide post drive features 98 to further improve the efficiency and safety with which holes 34 and electrical outlet openings 36 may be cut in wallboard 30. Persons knowledgeable in the art will find numerous possible drive features 96 and 98 obvious and within the scope of the invention. The handle 94 may be made of any substantially rigid and durable material.

The shape and size of the wallboard cutting device 50 and the pattern of spikes 54 or 84 can vary depending on the shape and size of the electrical box 10 with rectangular, square, round, and other shaped devices 50 and patterns readily possible. By way of non-limiting examples, there may be wallboard cutting devices 50 sized to cut the entire opening 36 for quad or triple gang or other multiple-width outlets at once. In other practices, one wallboard cutting device 50 may be aligned and applied multiple times, such as in parallel, with one or more suitably configured protective covers 20. Such protective covers 20 might, for example, have multiple protruding pins 26 spaced thereover to permit multiple adjacent or overlapping apertures 36 to be cut. For example, a single-width cutting device 50 might be employed to first cut one single-width opening 36, Then, further adjacent or contiguous openings 36 can be cut, such as by using multiple protrusion pins 26 or perhaps a row of perforations already made by the wallboard cutting device 50 as guides to align a second cutting area. The process can be continued until the wallboard 30 covering the entire multiple-width electrical box 10 has been sufficiently perforated for safe and efficient removal of the overlying wallboard 30.

The wallboard cutting device 50 for assisting in the cutting of wallboard openings 36 for electrical boxes 10 thus disclosed permits such openings 36 to be created with accuracy and with minimized risk of injury to the user in a rapid and efficient manner. With the pattern of spikes 54 or 84 corresponding in shape and size to the desired opening 36 in the wallboard 30, the wallboard cutting device 50 produces accurate and consistent openings without reliance on significant expertise of the user while substantially eliminating the risk of damage to electrical wiring. The wallboard cutting device 50 assists in cutting of wallboard openings 36 for electrical boxes 10 while remaining durable. With the required penetrating force dependent only on the sharp spikes 54 or 84, the likelihood of damage to surrounding wallboard is reduced. By repeated application of the wallboard cutting device 50 and, additionally or alternatively, the particular configuration of the pattern of spikes 54 or 84, the wallboard cutting device 50 is readily applicable to electrical boxes of a variety of shapes and sizes.

With certain details and embodiments of the present invention for a device for assisting in the cutting of wallboard openings for electrical boxes disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all equivalents thereof.

I claim as deserving the protection of Letters Patent:

1. A cutting device for assisting in the cutting of wallboard openings for electrical boxes, the device comprising:
   a base frame; and
   a plurality of spikes that project from the base frame in a spike pattern;
   wherein the spike pattern defines a periphery of an opening to be cut in a wallboard whereby the plurality of spikes perforate the wallboard in the spike pattern when the plurality of spikes are driven into the wallboard;
   wherein each of the plurality of spikes has a shank, wherein the shank of each of the plurality of spikes passes through the base frame, wherein each of the plurality of spikes is slidably engaged with the base frame, wherein the base frame has an outer face and an inner face, and wherein shanks of the spikes project from the inner face of the base frame and heads of the spikes are disposed to the outer face of the base frame;
   a backing member adapted to be retained to overlie the outer face of the base frame and the heads of the plurality of spikes to retain the plurality of spikes relative to the base frame wherein the backing member has at least one channel therein wherein the at least one channel has a shape corresponding to the spike pattern.

2. The cutting device of claim 1 wherein the spike pattern comprises upper and lower series of spikes disposed in generally parallel upper and lower lines and first and second lateral series of spikes disposed in generally parallel lateral lines.

3. The cutting device of claim 2 wherein there are at least ten spikes in each of the first and second lateral series of spikes.

4. A cutting device for assisting in the cutting of wallboard openings for electrical boxes, the device comprising:
   a base frame; and
   a plurality of spikes that project from the base frame in a spike pattern;
   wherein the spike pattern defines a periphery of an opening to be cut in a wallboard whereby the plurality of spikes perforate the wallboard in the spike pattern when the plurality of spikes are driven into the wallboard and wherein the spike pattern is generally rectangular;
   wherein each of the plurality of spikes has a shank, wherein the shank of each of the plurality of spikes passes through the base frame, wherein each of the plurality of spikes is slidably engaged with the base frame, wherein the base frame has an outer face and an inner face, and wherein shanks of the spikes project from the inner face of the base frame and heads of the spikes are disposed to the outer face of the base frame;
   a backing member adapted to be retained to overlie the outer face of the base frame and the heads of the plurality of spikes to retain the plurality of spikes relative to the base frame.

5. The cutting device of claim 4 wherein the base frame has an outer face and an inner face and wherein the spikes project from the inner face of the base frame.

6. The cutting device of claim 4 further comprising a registration and alignment guide retained by the base frame.

7. The cutting device of claim 6 wherein the registration and alignment guide comprises one or more apertures in the base frame.

8. The cutting device of claim 7 wherein the registration and alignment guide comprises one aperture substantially centered laterally and longitudinally on the base frame.

9. The cutting device of claim 4 wherein the spike pattern has upper and lower series of spikes disposed in generally parallel upper and lower lines and first and second lateral series of spikes disposed in generally parallel lateral lines and wherein there are at least ten spikes in each of the first and second lateral series of spikes.

10. The cutting device of claim 4 further comprising a cover for being retained relative to an electrical box, a registration and alignment guide retained by the cover, and a registration and alignment guide retained by the base frame for engaging the registration and alignment guide retained by the cover.

11. The cutting device of claim 10 wherein the registration and alignment guide retained by the cover comprises at least one protruding pin and wherein the registration and alignment guide retained by the base frame comprises at least one aperture in the base frame for receiving the at least one protruding pin.

12. A cutting device for assisting in the cutting of wallboard openings for electrical boxes, the device comprising:
    a base frame; and
    a plurality of spikes that project from the base frame in a spike pattern;
    wherein the spike pattern defines a periphery of an opening to be cut in a wallboard whereby the plurality of spikes perforate the wallboard in the spike pattern when the plurality of spikes are driven into the wallboard;
    wherein each of the plurality of spikes is slidably engaged with the base frame whereby the plurality of spikes can be driven into the wallboard individually or in groups;
    a cover for being retained relative to an electrical box;
    a registration and alignment guide retained by the cover, the registration and alignment guide retained by the cover comprising at least one protruding pin and the registration and alignment guide retained by the base frame comprising at least one aperture in the base frame for receiving the at least one protruding pin;
    a registration and alignment guide retained by the base frame for engaging the registration and alignment guide retained by the cover;

a guide post with an aperture for slidably receiving the at least one protruding pin and for being slidably received through the at least one aperture in the base frame.

13. The cutting device of claim 12 further comprising a hole cutter for cutting a hole in wallboard surrounding the at least one protruding pin, the hole cutter with an aperture for slidably receiving the at least one protruding pin, and the hole cutter with a cutting formation at an end of the hole cutter for cutting wallboard surrounding the at least one protruding pin.

14. A cutting device for assisting in the cutting of wallboard openings for electrical boxes, the device comprising:
   a base frame; and
   a plurality of spikes that project from the base frame in a spike pattern;
   wherein the spike pattern defines a periphery of an opening to be cut in a wallboard whereby the plurality of spikes perforate the wallboard in the spike pattern when the plurality of spikes are driven into the wallboard;
   wherein each of the plurality of spikes is slidably engaged with the base frame whereby the plurality of spikes can be driven into the wallboard individually or in groups;
   wherein the spikes have generally round shanks with a diameter of the shanks and wherein the distance between the shanks of adjacent spikes within the spike pattern is less than the diameter of the shanks of the spikes.

15. A cutting device for assisting in the cutting of wallboard openings for electrical boxes, the device comprising:
   a base frame; and
   a plurality of spikes that project from the base frame in a spike pattern;
   wherein the spike pattern defines a periphery of an opening to be cut in a wallboard whereby the plurality of spikes perforate the wallboard in the spike pattern when the plurality of spikes are driven into the wallboard;
   wherein each of the plurality of spikes has a shank and a distal point wherein the shank of each spike has a helical formation disposed along the shank;
   wherein the spike pattern is generally rectangular with upper and lower series of spikes disposed in generally parallel upper and lower lines and first and second lateral series of spikes disposed in generally parallel lateral lines, and wherein there are at least ten spikes in each of the first and second lateral series of spikes;
   wherein the spikes have generally round shanks with a diameter of the shanks and wherein the distance between the shanks of adjacent spikes within the spike pattern is less than the diameter of the shanks of the spikes.

16. The cutting device of claim 15 wherein each of the plurality of spikes has a shank and a distal point wherein the shank of each spike has a helical formation disposed along the shank.

17. A cutting device for assisting in the cutting of wallboard openings for electrical boxes, the device comprising:
   a base frame; and
   a plurality of spikes that project from the base frame in a spike pattern;
   wherein the spike pattern defines a periphery of an opening to be cut in a wallboard whereby the plurality of spikes perforate the wallboard in the spike pattern when the plurality of spikes are driven into the wallboard;
   wherein the spikes have generally round shanks with an effective lateral dimension comprising an effective diameter of the shanks and wherein the distance between the shanks of adjacent spikes within the spike pattern is less than the effective diameter of the shanks of the spikes;
   wherein each of the plurality of spikes has a shank and a distal point wherein the shank of each spike has a helical formation disposed along the shank.

* * * * *